United States Patent
Odinak et al.

(10) Patent No.: US 6,348,875 B1
(45) Date of Patent: *Feb. 19, 2002

(54) MESSAGE FORMATTING, AUTHENTICATION, AND ERROR DETECTION IN HOME CONTROL SYSTEMS

(75) Inventors: Gilad Odinak, Bellevue; Nigel S. Keam, Redmond, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/351,107

(22) Filed: Jul. 6, 1999

Related U.S. Application Data (62) Division of application No. 08/874,046, filed on Jun. 12, 1997.

(51) Int. Cl.[7] .................................................. H04Q 1/00
(52) U.S. Cl. ........................... 340/825.52; 340/310.01; 340/5.74; 380/21
(58) Field of Search ....................... 340/825.52, 825.46, 340/825.07, 310.01, 5.74; 380/21

(56) References Cited

U.S. PATENT DOCUMENTS

| | | | |
|---|---|---|---|
| 4,418,333 A | 11/1983 | Schwarzback et al. | 340/310.01 |
| 4,703,306 A | 10/1987 | Barrott | 340/310.06 X |
| 4,755,792 A | 7/1988 | Pezzolo et al. | 340/825.06 |
| 5,051,720 A | 9/1991 | Kittirutsunetorn | 455/402 X |
| 5,227,762 A * | 7/1993 | Guidette | 340/310.01 |
| 5,352,957 A | 10/1994 | Werner | 315/313 X |
| 5,471,190 A | 11/1995 | Zimerman | 340/310.01 |
| 5,570,085 A * | 10/1996 | Bertsch | 340/825.07 |
| 5,661,804 A * | 8/1997 | Dykema et al. | 380/21 |

* cited by examiner

*Primary Examiner*—Brian Zimmerman
(74) *Attorney, Agent, or Firm*—Lee & Hayes, PLLC (57) ABSTRACT

A system communicates over electrical wiring in a house or other building. Messages between components include a group identifier code, message data, and a message authentication code (MAC) that is calculated for each message. MACs are calculated using a shared key value and a one-way hash function.

13 Claims, 6 Drawing Sheets

MESSAGE FORMATTING, AUTHENTICATION, AND ERROR DETECTION IN HOME CONTROL SYSTEMS

RELATED APPLICATIONS

This is a divisional of U.S. patent application Ser. No. 08/874,046, filed Jun. 12, 1997.

TECHNICAL FIELD

This invention relates to automated home control systems and to formatting, authentication, and error detection in message between distributed components of a home control system that use existing electrical wiring for communications.

BACKGROUND OF THE INVENTION

A modern home potentially has a great number of sophisticated electrical systems, including security systems, audio/video systems, telephone systems, intercom systems, etc. All of these systems require interconnecting wiring. A security system for example, requires wiring between sensors, controllers, and alarm devices. Audio/video systems require a maze of wiring between different active components, as well as wiring to as many as six speakers in a single room. Telephone and intercom systems similarly require wires between stations.

When systems such as these are installed during construction of a new home, wiring can be installed with little trouble. When adding systems to an existing house, however, installation of required wiring often requires significant effort.

Because of the difficulty of installing interconnecting wiring in an existing home, there are many available products that utilize existing AC power distribution wires or lines in a house for communications of various types. Products such as these work by modulating a signal on the power lines at a frequency that is well above the conventional 60 Hz frequency of electrical power carried by the distribution lines.

The so-called "X10" protocol is popular for providing simple communications between common electrical components such as security components, switchable power receptacles, dimmers, and other power control modules. The X10 system provides basic functionality between command modules and receivers of various types. In general, however, this system is limited to on/off and dimming capabilities.

A variety of other products are also available. Some home intercoms, for example, modulate an analog audio signal on the power lines to provide audio communications between two different rooms in a house, without requiring dedicated wiring. Extension telephones are available that utilize existing power lines rather than requiring the installation of telephone cable. Adapters are also available for transmitting video and stereo audio over existing power lines in a house.

There are a number of different protocols used for communications over existing building wiring. The relatively simple X10 communications protocol is one example. An X10 signal is composed of a series of 5 volt, 121 KHz pulses having a duration of 1 millisecond, positioned at zero crossings of the 60 Hz AC power signal. Each pulse corresponds to a binary 1, and the absence of a pulse corresponds to a binary 0. A single X10 command or message consists of a 22 bit word obtained from eleven complete cycles of the AC power signal.

All X10 receivers plugged into the household power lines will see all transmitted signals. However, each command carries the address of its intended receiver. A receiver responds to only those commands that have the address of the receiver. Thus, control modules such as switch modules can be paired with receiver modules by manually setting both addresses to the same value. Up to 256 addresses are available. Computer interfaces are available for allowing a computer to issue commands to different X10 receivers over home power lines.

The X10 system is just one example. A variety of different electrical schemes are used for communicating binary data in other systems. At a higher level, various data protocols are used to route messages and commands to intended receivers and to allow error detection and/or correction.

Most existing data protocols used in home controls systems are similar to network protocols, and therefore utilize packets or discrete data messages that include both source and destination addresses. Within a given system, all packets or messages are of a given length and format. In the X10 system, for example, each message is 22 bits in length, and 8 of these bits are used for addressing.

Some of these protocols provide for error detection, and some possibly provide for authentication.

A significant weakness of existing home control protocols is that they force all participating components to use the same data format and to understand the same commands or command codes. In the X10 system described above, the command structure is very simple, and is sufficient for on/off control and dimming of household electrical components and appliances. However, the command structure is probably not appropriate for more sophisticated control tasks such as, for example, programming a VCR from another wired component. For more sophisticated control jobs, more sophisticated command structures have been devised. However, they add unnecessary complexity when simple jobs need to be performed.

Similarly, all components are required to use identical data exchange protocols. For example, some protocols require a specific sequence of commands and acknowledgements, even though acknowledgements are not necessary in every situation.

Another weakness of existing home control protocols is that they either provide no message authentication or do so in a way that adds significant overhead to control procedures. Many authentication techniques utilize either a shared encryption key or a private/public key pair. In prior art systems, this requires exchanging the keys in a way that prevents other components from "eavesdropping" and thereby learning the keys. This can become quite complicated, and consumes notable bandwidth when changing key values.

The invention described below includes a home control message format that is efficient and effective. A significant advantage of the format is that different sets of household components can define their own command structures. Simple devices (such as light switches, receptacles, etc.) can use command structures that are relatively simple. More sophisticated components (such as audio components, video components, computers, etc.) can use command structures that are relatively more complicated.

Another advantage of the invention is that message authentication can be performed without significant communications overhead. Although the invention utilizes an authentication scheme based on a shared key value that changes with time, key values themselves (which are potentially very large) are not transmitted between components.

SUMMARY OF THE INVENTION

The invention includes groups of sending and receiving components that communicate using household electrical wiring. Often, such a group is a pair of components, one of which is a controlling component such as a switch module, and another of which is a controlled component such as a switchable power receptacle.

The components of an individual group communicate by sending and receiving discrete messages between themselves. Each group of components is assigned a unique group identifier code, and messages between components of a group each include the group identifier code of that group. Although individual components receive messages from other groups, they are configured to disregard such messages that have group identifier codes that are different than that of the group to which the component belongs. Thus, although all components share the same transmission medium, virtual connections are formed between individual components based on their group identifier codes. The codes require fewer bits to encode than traditional source/destination addresses such as used in the prior art.

Messages are authenticated using a message authentication code that is calculated for and included in each message. The message authentication code for a message within a particular group is derived from message data and from a key value that is shared between the components of the group. A one-way hash function is used to calculate the key value.

The shared key value changes, at the discretion of one or more components of the group. Rather than transmitting a new key value when a change is desired, each component has information that enables it to independently calculate a common sequence of key values. When a key change occurs, each component of the group starts using the next key value in the sequence.

More specifically, key values are calculated using a one-way hash function, based on a common and unchanging seed value, and a counter that is incremented by one for each sequential key value. Thus, a new key value is calculated by incrementing the counter and then applying the hash function to the seed value and the counter value.

Another feature of the invention is that key changes are made arbitrarily by one component, without explicitly notifying other components. Rather, another component, upon receiving a message that does not authenticate with the current key value, tries the subsequent key value. If that value works, it is adopted as the current key value for future communications. Otherwise, the message is ignored, and the current key value is left unchanged.

DETAILED DESCRIPTION

Figure 1:
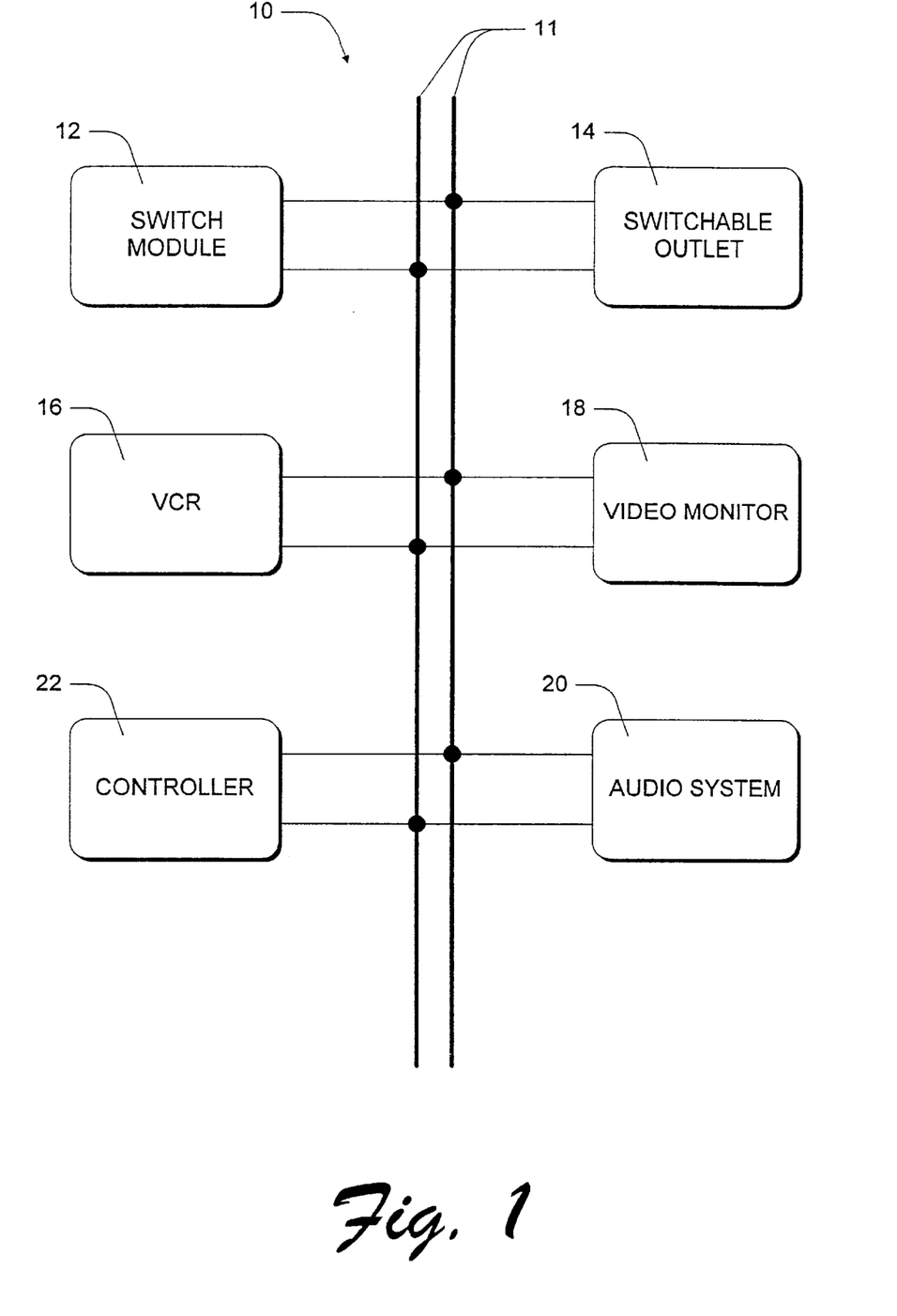
FIG. 1 is a block diagram of a home control system in accordance with the invention.

FIG. 1 shows an example of a home control system 10 that uses electrical power lines 11 in a building for communications. The system comprises a plurality of electrical components that are connectable for communications among themselves through the electrical power lines. Such components comprise, for example, a switch module 12, a switchable outlet 14, a VCR (video cassette recorder) 16, a video monitor 18, an audio system 20, and a controller 22. These components have control transmitters and/or control receivers, thus allowing the components to communicate digitally with each other on a digital communications channel. Some of the components are also analog signal sources, while others are analog signal receivers.

Figure 2:
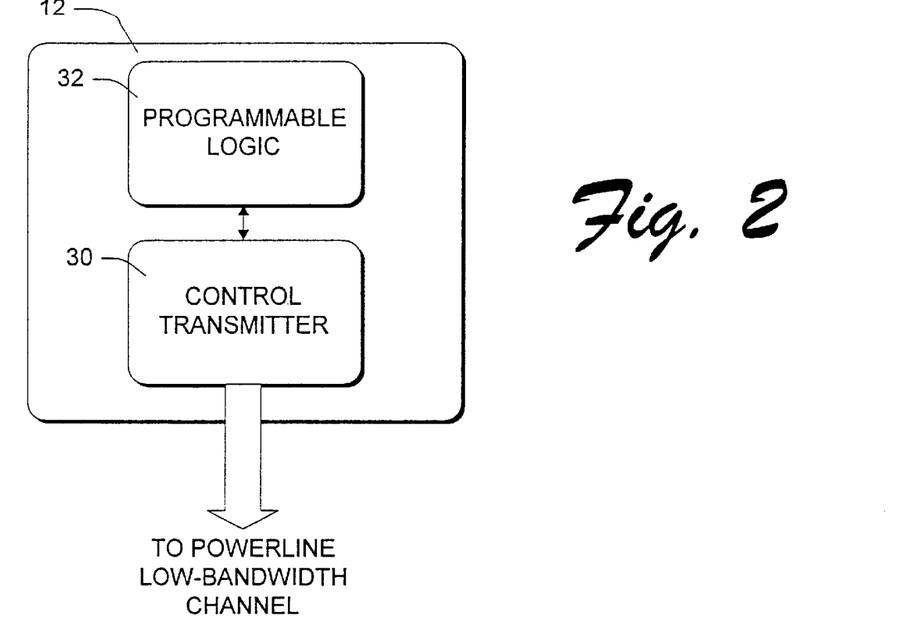
FIG. 2 is a block diagram of a switch module in accordance with the invention.

FIG. 2 shows an example of a simple power control component such as switch module 12 that communicates with other electrical components using electrical power lines. A component such as this has an associated control transmitter 30 that is connected to transmit control data using a frequency channel on the electrical power lines. Switch module 12 also has some type of programmable logic 32 such as an inexpensive microprocessor or microcontroller in conjunction with computer-readable program storage medium such as electronic, randomly-addressable memory. The program storage medium contains instructions that are executable by the microprocessor to perform the methodological steps described below.

The programmable logic 32 is connected and configured or programmed to compose and send messages in conjunction with the transmitter. Transmitter 30 modulates the message data on the communications channel. The particular low-level data format is described in a co-pending U.S. Patent Application by inventors Gilad Odinak, Nigel Keam, and Craig Ranta, entitled "Bit Encoding in Home Control Systems", filed concurrently with this application, which is hereby incorporated by reference.

Figure 3:
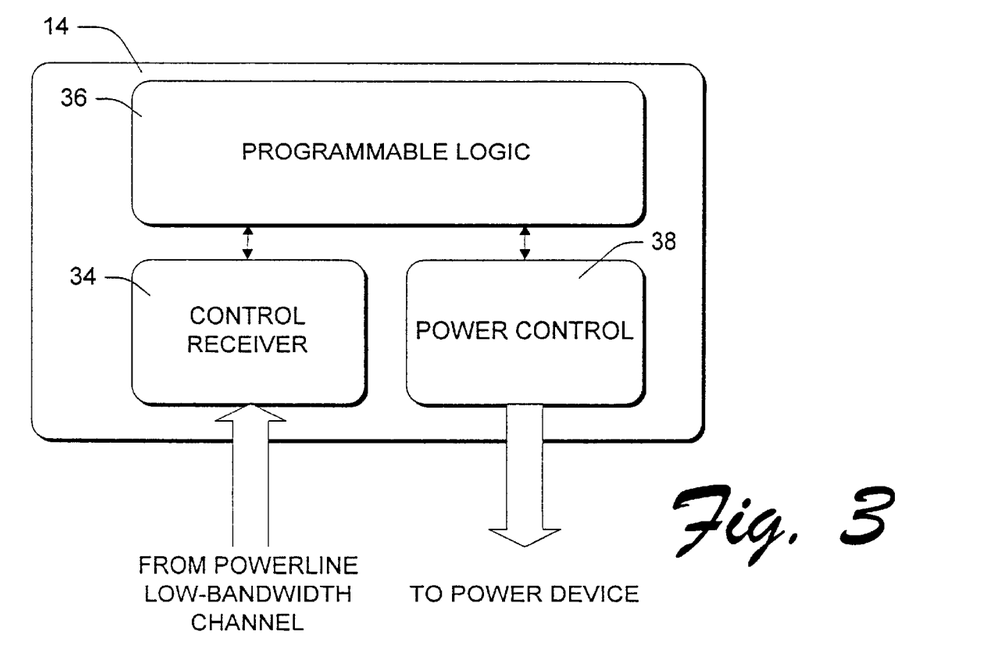
FIG. 3 is a block diagram of a switchable outlet in accordance with the invention.

FIG. 3 shows an example of a simple receiver component such as switchable outlet 14. A component such as this has an associated control receiver 34 that is connected to receive control data using the communications channel over the electrical power lines. Again, the receiver is implemented using conventional circuitry such as conmmonly used to implement wireline and/or wireless communications systems, with precautions taken to protect against power line surges and noise. Switchable outlet 14 also has programmable logic 36, similar or identical to that described above, as well as power control circuitry 38. Data is demodulated from the low-bandwidth channel by receiver 34 and provided to programmable logic 36. Power control circuitry 38 is responsive to programmable logic 36 to selectably provide power to a power outlet or integrated component (not shown).

A typical system has a plurality of components using control transmitters and receivers, and a plurality of components using analog signal transmitters and receivers. All components use a common communications channel for control communications such as those described herein. However, the analog signal sources and receivers use different high-bandwidth analog channels, with correspondingly different carrier frequencies. Such high-bandwidth communications channels are described in a co-pending U.S. Patent Application by inventor Gilad Odinak entitled "Automated Home Control Using Existing Electrical Lines as a Communications Medium", filed concurrently with this application, which is hereby incorporated by reference.

The invention described herein concerns the high-level formatting of commands or control messages that are sent from one component to another within a home control system using the common communications channel described above, without regard for the particular low-level mechanism for conveying such commands or messages.

Note that although FIGS. 2 and 3 show components that each have either a transmitter or a receiver, most components will have both, and will act as both sending components and as receiving components. Depending on the data exchange protocol used within a particular group of components, components Might be required to acknowledge commands or to reply to commands in more sophisticated ways such as by returning data.

Figure 4:
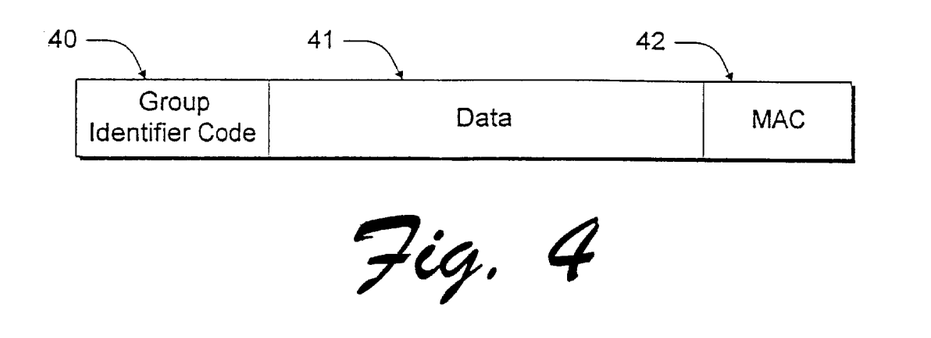
FIG. 4 is a block diagram of an inter-component message in accordance with the invention.

FIG. 4 show a data message in accordance with a preferred embodiment of the invention. The message is formatted with three portions, labeled 40, 41, and 42. The first portion is a group identifier code.

In accordance with the invention, components in a particular system are assigned to different groups. Each group consists of components that are intended to communicate with each other. Most often, a group will include only two components: a controlling component and a controlled component. For example, a light switch and a switchable outlet might form a single component group. The light switch would be a controlling component and the switchable outlet would be a controlled component. Such a group might alternatively include a light switch and a plurality of switchable outlets, with the light switch controlling all of them.

Each group is identified uniquely and collectively by a particular group identifier code. In the illustrated embodiment, this is an 8-bit number that is assigned during system configuration. A sending component (a component that is configured to send commands or messages) composes and sends messages that each include the group identifier code of the component's group.

Messages do not include identifiers of specific components. Receiving components (components configured to receive commands or messages) receive messages from components of different groups that use the same, common communications medium (a specific frequency channel carried by the household wiring). However, receiving components are configured to disregard messages that include a group identifier code different than the group identifier code of the receiving component's group. Thus, components respond only to messages from other components within the same group, and ignore messages from components of other groups. The group identifier codes, in effect, specify different virtual circuits or connections within the overall communications system formed by the common household wiring.

The second portion of a message in accordance with the invention comprises a data or command section 41. The home control format described herein does not specify the content or length of this section. Rather, its content and length are defined by the components of each group. Thus, each group can use a different format for this section. Groups having only relatively simple components might use a relatively simple format, such as a single 4-bit code indicating one of 16 possible commands. Other component groups might use more sophisticated, multi-field or variable field formats.

Different data exchange protocols can also be used by the different component groups. One group might use an open-loop or one-way format, where commands are sent from controlling components to controlled components without acknowledgement. Another group might use a closed-loop or two-way format, where all commands are acknowledged and data transfer occurs bi-directionally. Sophisticated exchange sequences can be defined between components in order to exchange data between components. Again, the particular formats and protocols used within particular groups varies according to the needs of the components.

The third portion of the message, following the data portion, comprises a message authentication code (MAC) 42. MAC 42 is a 24-bit code (in this example) that is calculated for each message. The MAC is based on a predetermined on-way hash function the message's data portion and of a key value that is shared between each of the plurality of components within a single group of components. The shared key value is communicated to all components of a group during system initialization. Alternative methods of deriving and changing the shared key value within a group are described below.

In the described embodiment, the MAC is calculated by first calculating an 8-bit checksum of message data. The checksum is then encrypted using a one-way hash function and a 40-bit shared key value, to obtain the 24-bit MAC. A one-way hash function is a function that produces an output number or code based on one or more input variables, wherein it is very difficult or practically impossible to determine the input variables from the output code (even when the one-way hash function is known). Such functions are well known in encryption technology.

When a receiving component of a particular group receives a message that includes the group identifier code of the group to which the receiving component belongs (and that is therefore not disregarded), the component examines the message's MAC to authenticate the message (to determine whether the message is what it purports to be). More specifically, the receiver calculates its own MAC based on the same predefined one-way function used by sending component, based on the data portion of the message and on the shared key value. Thus, the receiver calculates a checksum of the message data, and encrypts the checksum using the one-way hash function and the 40-bit shared key value. The resulting MAC is compared to the MAC in the message. The receiver concludes that the message is either not authentic or contains a data error if the first and second MACs do not match. In the described embodiment, the two MACs must be identical. In other embodiments, the MACs might match only in the sense that they have some predefined relationship to each other.

Figure 5:
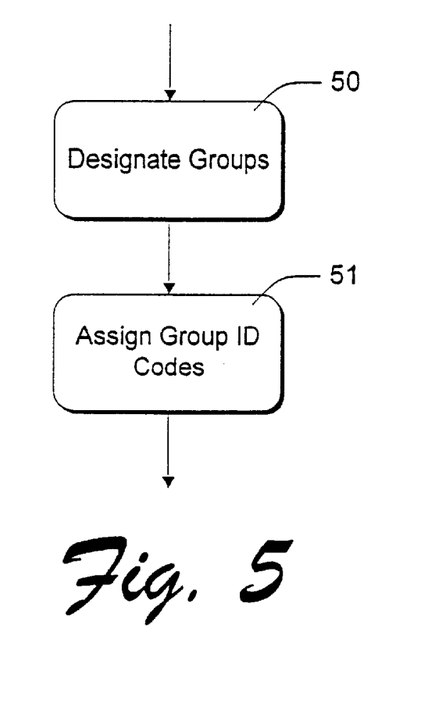
FIG. 5 is a flowchart of initialization steps in accordance with the invention.
Figure 6:
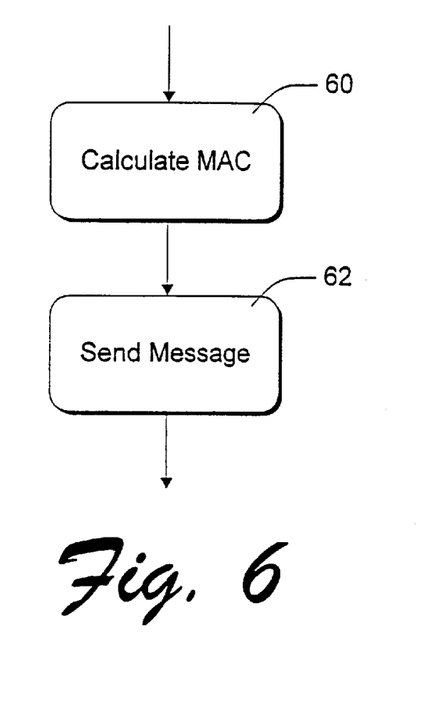
FIG. 6 is a flowchart showing steps performed by a transmitting device in accordance with the invention.
Figure 7:
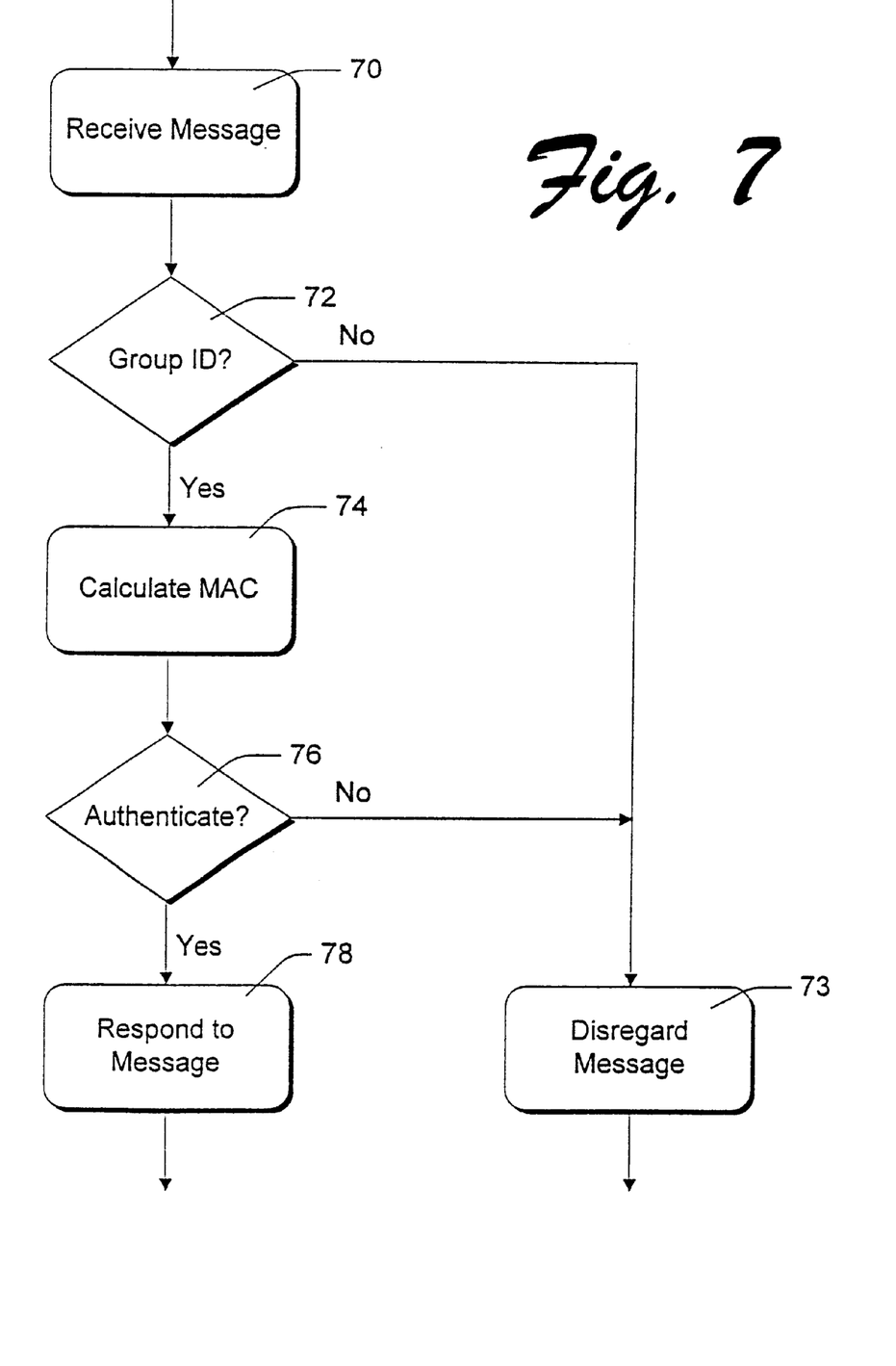
FIG. 7 is a flowchart showing steps performed by a receiving device in accordance with the invention.

FIGS. 5–7 shows preferred steps for implementing the invention in a home control system. FIG. 5 shows steps that are performed during system design or initialization. These steps include a step 50 of designating groups of the electrical components that communicate among themselves. A step 51 comprises assigning a different group identifier code to each respective group of components.

FIG. 5 shows a second set of steps are performed by a sending component. These steps are implemented by appropriately programming or otherwise configuring the processors and other components of the respective sending devices.

A sending component composes a message by performing a step 60 of calculating a first MAC based on the predefined one-way function of message data and of the shared key value. The transmitter then performs a step 62 of sending the message over the electrical power lines, including both the group identifier code and the MAC in the message.

FIG. 7 shows a third set of steps are performed by a receiving component. Again, these steps are implemented by appropriately programming or otherwise configuring the processors and other components of the respective receiving devices.

To determine whether a particular message is intended for a particular receiving component, the receiving component checks whether the group identifier code of the message matches the group identifier code of the receiving component's group. More particularly, a step 70 comprises receiving a message from another electrical component using the electrical power lines. Received messages include both a group identifier code and a MAC. Step 72 comprises comparing the group identifier code contained in the message with the group identifier code of the component's group, and disregarding (block 73) any messages that include a group identifier code different than the code that is uniquely associated with the component's group.

A step 74 comprises calculating a second MAC for each message that is not disregarded. The second MAC is again based on the predefined one-way function of data from the message and of the shared key value. Step 76 comprises comparing the first and second MACs. If they do not match, the receiver concludes that the message is either not authentic or contains a data error. In either case, the message is again disregarded.

This scheme has several advantages. One advantage is that overhead is minimized by using a group identifier code rather than source and destination addresses. Because there are fewer component groups than components, fewer bits are needed to encode for group identifier codes as compared to source/destination combinations. Another advantage is the data formats and protocols can be adopted according to the needs of different components. This allows simple, efficient protocols to be used where adequate, while allowing more sophisticated protocols to be used when necessary. A further advantage is that a single code (the MAC) is used both for authentication and error detection. This minimizes non-data bits in messages and reduces the time required to compose and verify messages.

The invention includes further techniques for specifying and changing the shared key values used by different groups of components to calculate message-specific MACs. In the preferred embodiment of the invention, the shared key value for a particular group changes from time to time as determined by one of the components of the group. The shared key value is taken from an ordered sequence of key values, so that new key values are not required to be transmitted between components. Rather, each component of the group either knows or is able to calculate sequential key values in the ordered sequence. In the preferred embodiment, the key values are based on a variable that changes in a predefined sequence to generate the sequential key values. More specifically, the key value is calculated using a predefined one-way function of a counter value that increments or advances to generate each sequential key value. Even more specifically, the key value is calculated as a one-way function of a seed value and of a counter value. The seed value is common to each component of a group, and is assigned during system setup and initialization. The counter value begins at 0 or some other number that is defined at system setup, and advances by one for every key value change. The various components of a group remain synchronized so that they all use the same counter value at any given time or for any specific message.

In one embodiment of the invention, a controlling component would notify other components of its group when changing from a current to a subsequent key value in the ordered sequence of key values. This would provide explicit key value synchronization between components.

In the preferred embodiment of the invention, however, any given component can change the key value without notifying other components. Such other components are configured to change from its current key value to the subsequent key value in the sequence upon receiving a message that does not authenticate with the current key value, but that does authenticate with the subsequent key value. In this manner, all components change keys at the same time, without any explicit signaling and without any exchange of actual key values.

Figure 8:
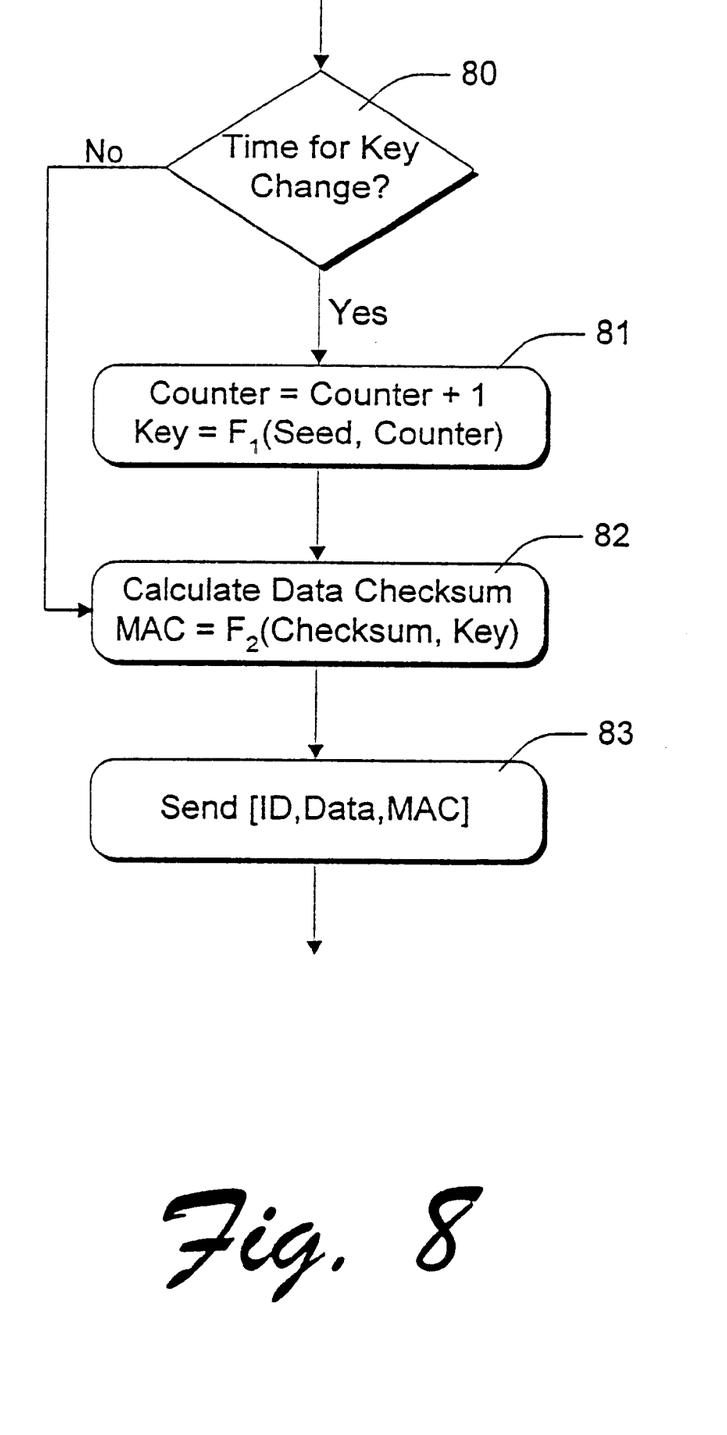
FIG. 8 is flowchart showing further steps performed by a transmitting device in accordance with the invention.

FIG. 8 shows preferred steps performed by a sending or controlling electrical component in accordance with these further aspects of the invention. FIG. 8 assumes that message content has already been formulated, and that the message content is to be encapsulated as shown in FIG. 4.

A step 80 comprises checking whether it is time for a change in the key value. Key value changes can be made at random times or after a random number of messages. In the preferred embodiment, key changes are made whenever a message's data may be identical to a previously sent message.

Steps 81 are performed only if it is time for a key change. Otherwise, step 82 is performed next. Steps 81 comprise incrementing a counter and calculating a new key value. As indicated in FIG. 6, the new key value Key is calculated as a function $F_1$ of a seed value Seed and the incremented Counter variable. Function $F_1$ is a one-way hash function that results in the 40-bit key value.

Steps 82 comprise calculating a checksum and then calculating a MAC for a message that is being sent. As described above, the checksum is based on the message data. The MAC is a function $F_2$ of the checksum and key value Key. Functions $F_1$ and $F_2$ are the same, although they could be different in other embodiments.

Step 83 is then performed of sending the message. A single message includes a group identifier code ID, the message data itself, and the calculated MAC. The message contains no explicit indication that there has been a key change.

Figure 9:
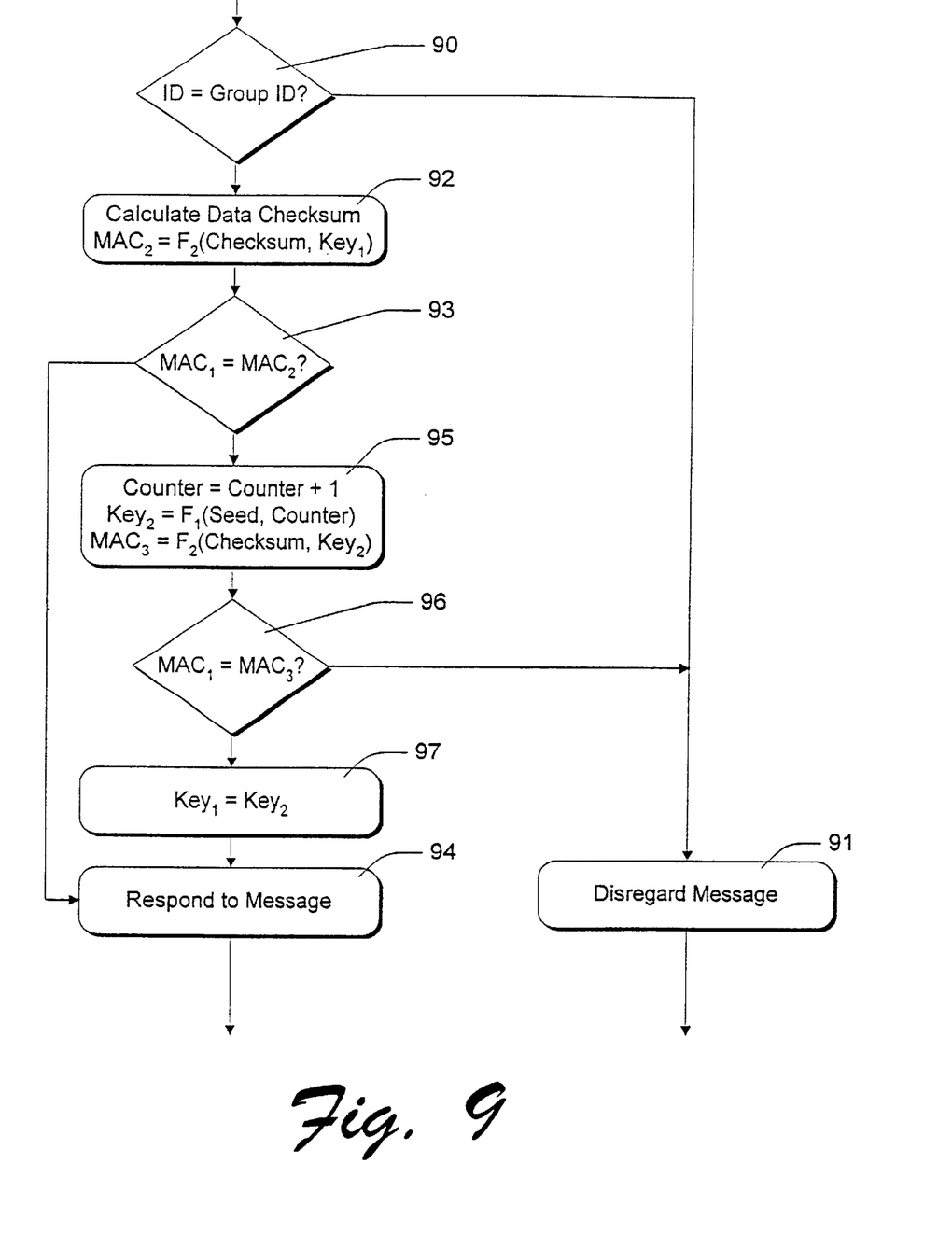
FIG. 9 is a flowchart showing further steps performed by a receiving device in accordance with the invention.

FIG. 9 shows steps performed by a receiving or controlled electrical component in response to receiving a message of the format described above, containing a group identifier code, message data, and a MAC. In FIG. 9, the MAC included in the message is referred to as first $MAC_1$ to distinguish it from other MACs that are calculated by the receiver.

A step 90 comprises checking whether the group identifier contained in the message is the same as that of the component group to which the receiving component belongs. If it is not, the message is disregarded, as indicated by execution block 91. Otherwise, execution continues with block 92, which includes calculating a checksum based on the message data and calculating a second $MAC_2$ based on the checksum and a current key value that is referenced as $Key_1$. Second $MAC_2$ is calculated using the one-way hash function $F_2$—the same hash function used by the sending component to calculate $MAC_1$ that is contained in the message.

Step 93 comprises checking whether first $MAC_1$ (calculated by the sending component) is equal to second $MAC_2$ (calculated by the receiving component). If it is, the message is considered valid and the receiving device responds to the message as indicated by block 94. The response is determined by the particular message data contained in the message, and by the particular data and exchange protocols used by the communicating devices. As already desribed, different pairs or groups of components can use widely differing data and exchange protocols.

If the result of step 93 is negative (first $MAC_1$ is not equal to second $MAC_2$), steps 95 are performed. These steps include incrementing a local counter variable Counter, and calculating a new key value $Key_2$ based on the new counter and the predefined seed which is used in common by the controlling or sending device and the controlled or receiving device. The new key value is calculated using hash function $F_1$, which is the same function as used by the sending component to calculate its key value. The new key value is the next key value in the sequence of key values, and is therefore referred to as a subsequent key value.

Steps 95 also include calculating a third MAC, referenced as $MAC_3$. This MAC is calculated just the same way as $MAC_2$, using the one-way hash function $F_2$, except that the subsequent key value is used.

Step 96 comprises checking whether $MAC_1$ equals newly calculated $MAC_3$. If it does, a step 97 is performed of making subsequent key value $Key_2$ the current key value. The receiving device then responds to the message in step 94. If $MAC_1$ does not equal $MAC_3$, the message is disregarded in block 91, and the current key value is left unchanged. If a response is required of the receiving component, the response is transmitted using whatever key value is current after these steps.

Note that in actual practice, the calculation of key values might consume significant time. Therefore, current and subsequent key values are calculated ahead of time.

Also note that responsibility for changing the key value from its current value to the subsequent value can be allocated in different ways. For example, a single controlling component might be the only component allowed to change the key value. Alternatively, any component might be allowed to change the key value, with all other components in the group reacting by also changing to the subsequent key value.

A precaution is optionally implemented to guard against the unlikely is situation where the controlled component successfully, but mistakenly, authenticates a message with the subsequent key value. To allow resynchronization in this case, in which the controlling component has not actually changed the key value, the controlled component stores the old key value and attempts to authenticate with it when neither the current nor the subsequent key values work.

The described technique for calculating and synchronizing key values allows an effective authentication scheme to be used without requiring additional communications bandwidth for communicating key values. Furthermore, avoiding the transmission of explicit synchronization messages or signals eliminates a certain amount of complexity which would be required to prevent eavesdropping components from taking advantage of such synchronization messages.

Although the invention has been described in language more or less specific as to structural and methodological features, it is to be understood that the invention is not necessarily limited to the specific features or steps described. Rather, the specific features and steps are disclosed as preferred forms of implementing the invention.

What is claimed is:

1. A computer-readable storage medium having instructions that are executable by an electrical component that communicates electronically using electrical power lines in a building, the instructions being executable to perform actions comprising:

composing and sending data messages over the electrical power lines;

calculating first message authentication codes for the data messages using a predefined one-way function of data from the messages and of a key value that is shared between a group of electrical components;

including the first message authentication codes in the data messages.

2. A computer-readable storage medium as recited in claim 1, the instructions being executable to perform further actions comprising:

calculating a second message authentication code for each received message using the predefined one-way function of data from the message and the key value that is shared by the group of electrical components;

concluding that a message is either not authentic or contains a data error if the calculated second message authentication code does not match the first message authentication code that is included in the message.

3. A computer-readable storage medium having instructions that are executable by a component that communicates electronically using electrical power lines in a building, wherein messages between components include first message authentication codes, the instructions being executable to perform actions comprising:

receiving messages from other components using the electrical power lines;

calculating a second message authentication code for each received message based on a predefined one-way function of the data from the message and of a key value that is shared between a group of components; and concluding that the message is either not authentic or contains a data error if the first and second message authentication codes do not match.

4. A computer-readable storage medium having instructions that are executable by an electrical component that communicates electronically using electrical power lines in a building, the instructions being executable to perform steps comprising:

calculating a message authentication code based on a predefined one-way function of data from a message and of a key value that is shared by components of a particular group of electrical components;

including the message authentication code in the message;

sending the message over the electrical power lines.

5. A computer-readable storage medium as recited in claim 4, wherein the shared key value is from a sequence of key values, the instructions being executable to perform further steps comprising a step of changing from a current to a subsequent key value in the sequence without notifying other components.

6. A computer-readable storage medium as recited in claim 4, wherein the shared key value is from a sequence of key values, the instructions being executable to perform a further step of calculating the sequence of key values using a one-way function of a counter value that advances to generate each sequential key value.

7. A computer-readable storage medium having instructions that are executable by an electrical component that communicates electronically using electrical power lines in a building, the instructions being executable to perform steps comprising:

receiving a message that contains a first message authentication code;

calculating a second message authentication code based on a predefined one-way function of data from the message and of a key value that is shared by a plurality of electrical components;

concluding that the message is either not authentic or contains a data error if the first and second message authentication codes do not match.

8. A computer-readable storage medium as recited in claim 7, wherein the shared key value is from a sequence of key values, the instructions being executable to perform a further steps comprising:
- calculating a third message authentication code based on the predefined one-way function of the data from the message and of a key value in the sequence of key values that is subsequent to a current key value;
- further comparing the first and third message authentication codes to authenticate each message;
- changing from the current key value to the subsequent key value if the first and second message authentication codes do not match but the first and third message authentication codes do match.

9. A computer-readable storage medium as recited in claim 7, the instructions being executable to perform a furrier step of calculating the sequence of key values using a one-way function of a counter value that advances to generate each sequential key value.

10. An apparatus comprising:
- a storage medium having stored therein a plurality of executable instructions;
- an execution unit, coupled to the storage medium, to implement a home control service, which, when invoked composes and sends data messages over electrical power lines;
- wherein the home control service calculates first message authentication codes for the data messages using a predefined one-way function of data from the messages and of a key value that is shared between a group of electronic devices, and includes the first message authentication codes in the data messages.

11. An apparatus as recited in claim 10, wherein the home control service calculates a second message authentication code for each received message using the predefined one-way function of data from the message and the key value that is shared by the group of electronic devices, and determines that a message is either not authentic or contains a data error if the calculated second message authentication code does not match the first message authentication code that is included in the message.

12. A system comprising:
- one or more electrical lines;
- an electronic device, coupled to receive power from said one or more electrical lines, and to communicate with other electronic devices coupled to the electrical lines by composing and issuing data messages over the electrical power lines;
- wherein the electronic device calculates first message authentication codes for the data messages using a predefined one-way function of data from the messages and of a key value that is shared between a group of electronic devices, and includes the first message authentication codes in the data messages.

13. A system as recited in claim 12, wherein the electronic device calculates a second message authentication code for each received message using the predefined one-way function of data from the message and the key value that is shared by the group of electronic devices, and determines that a message is either not authentic or contains a data error if the calculated second message authentication code does not match the first message authentication code that is included in the message.

* * * * *

UNITED STATES PATENT AND TRADEMARK OFFICE
CERTIFICATE OF CORRECTION

PATENT NO.    : 6,348,875 B1
DATED         : February 19, 2002
INVENTOR(S)   : Odinak et al.

It is certified that error appears in the above-identified patent and that said Letters Patent is hereby corrected as shown below:

<u>Column 8,</u>
Line 64, replace "desribed" with -- described --.

<u>Column 9,</u>
Line 35, delete "is" after "unlikely".

Signed and Sealed this

Twenty-fifth Day of June, 2002

Attest:

Attesting Officer

JAMES E. ROGAN
*Director of the United States Patent and Trademark Office*